(12) United States Patent
Kroon et al.

(10) Patent No.: US 11,792,453 B2
(45) Date of Patent: Oct. 17, 2023

(54) CODING SCHEME FOR IMMERSIVE VIDEO WITH ASYMMETRIC DOWN-SAMPLING AND MACHINE LEARNING

(71) Applicant: KONINKLIJKE PHILIPS N.V., Eindhoven (NL)

(72) Inventors: Bart Kroon, Eindhoven (NL); Christiaan Varekamp, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 14 days.

(21) Appl. No.: 17/642,965

(22) PCT Filed: Sep. 18, 2020

(86) PCT No.: PCT/EP2020/076197
§ 371 (c)(1),
(2) Date: Mar. 15, 2022

(87) PCT Pub. No.: WO2021/058402
PCT Pub. Date: Apr. 1, 2021

(65) Prior Publication Data
US 2022/0345756 A1    Oct. 27, 2022

(30) Foreign Application Priority Data

Sep. 24, 2019  (EP) .................... 19199240

(51) Int. Cl.
*H04N 21/2365* (2011.01)
*H04N 19/597* (2014.01)
(Continued)

(52) U.S. Cl.
CPC ....... *H04N 21/2365* (2013.01); *H04N 19/597* (2014.11); *H04N 21/234345* (2013.01); *H04N 21/816* (2013.01)

(58) Field of Classification Search
None
See application file for complete search history.

(56) References Cited

U.S. PATENT DOCUMENTS

2012/0170841 A1   7/2012  Lee et al.
2017/0337726 A1*  11/2017  Bui .......................... G06T 7/97
(Continued)

FOREIGN PATENT DOCUMENTS

EP            2922021 A1      9/2015

OTHER PUBLICATIONS

Alvaro Collet et al., High-Quality Streamable Free-Viewpoint Video, ACM Trans. Graphics (SIGGRAPH), 34(4), url: http://hhoppe.com/proj/fvv/, 2015.

(Continued)

*Primary Examiner* — Junior O Mendoza

(57) ABSTRACT

Methods of encoding and decoding immersive video are provided. In an encoding method, source video data comprising a plurality of source views is encoded into a video bitstream. At least one of the source views is down-sampled prior to encoding. A metadata bitstream associated with the video stream comprises metadata describing a configuration of the down-sampling, to assist a decoder to decode the video bitstream. It is believed that the use of down-sampled views may help to reduce coding artifacts, compared with a patch-based encoding approach. Also provided are an encoder and a decoder for immersive video, and an immersive video bitstream.

16 Claims, 8 Drawing Sheets

(51) Int. Cl.
*H04N 21/2343* (2011.01)
*H04N 21/81* (2011.01)

(56) References Cited

U.S. PATENT DOCUMENTS

2018/0242017 A1  8/2018 Van Leuven et al.
2019/0364204 A1* 11/2019 Wozniak ............... H04N 21/816
2019/0364259 A1* 11/2019 Chen ................ H04N 21/23412

OTHER PUBLICATIONS

Joel Jung, Bart Kroon, Jill Boyce, Common Test Conditions for Immersive Video, ISO/IEC JTC1/SC29/WG11 MPEG/N18443, Mar. 2019, Geneva, Switzerland.
Basel Salahieh, Bart Kroon, Joel Jung, Marek Domahski, Test Model for Immersive Video, ISO/IEC JTC 1/SC 29/WG11 MPEG/N18470, Mar. 2019, Geneva, Switzerland.
NVIDIA Turing GPU Architecture, url: https://www.nvidia.com/content/dam/en-zz/Solutions/design-visualization/technologies/turing-architecture/NVIDIA-Turing-Architecture-Whitepaper.pdf, document ID WP-09183-001_v01, pp. 34-36, 2018.
Jongbeom Jeong et al: 3DoF+ 360 Video Location-Based Asymmetric Down-Sampling for View Synthesis to Immersive VR Video Streaming,Sensors,vol. 18, No. 9,Sep. 18, 2018 (Sep. 18, 201), p. 3148.
Chao Dong et al: "Learning a Deep Convolutional Network for Image Super-Resolution" In: "RoboCup 2008: RoboCup 2008: Robot Soccer World Cup XII",Jan. 1, 2014 (,Jan. 1, 2014), Springer Internationa Publishing, Cham 032682, XP055545078,ISBN: 978-3-319-10403-4vol. 8692, pp. 184-199.
Hallapuro A et al: "Multiview and multiview-video-plus-depth support in SHM", 4. JCT-3V Meeting; Apr. 20, 2013-Apr. 26, 2013; Incheon; (The Joint Collaborative Team on 3D Video Coding Extension Development of ISO/IEC JTC1/SC29/WG11 and Itu-T SG.16 ); URL: http://phenix.int-evry.fr/jct2/,, No. JCT3V-D0167,Apr. 15, 2013 (Apr. 15, 2013).
Takaaki Emori et al: "[FTV AHG] Study on free viewpoint video streaming using mixed resolution multi-view video and low resolution depth maps",110. MPEG Meeting; Oct. 20, 2014-Oct. 24, 2014; Strasbourg; (Motion Picture Expert Group or ISO/IEC JTC1/SC29/WG11),No. m3521319 Oct. 2014 (Oct. 19, 2014.
Qiong Liu et al: Cross-View Down/Up-Sampling Method for Multiview Depth Video Coding, IEEE Signal Processing Letters, IEEE Service Center, Piscataway, NJ, US, vol. 19, No. 5, May 1, 2012 (May 1, 2012),pp. 295-298.
Sullivan (Microsoft) G J et al: Meeting Report of the 13th JVET Meeting (Marrakech, Jan. 9-18, 2019),13. JVET Meeting; Jan. 9, 2019-Jan. 18, 2019; Marrakech; (The Joint Video Exploration Team of ISO/IEC JTC1/SC29/WG11 and ITU-T SG.16 ).No. JVET-M1000 Mar. 18, 2019 (Mar. 18, 2019).
International Search Report and Written Opinion from PCT/EP2020/076197 dated Nov. 8, 2020.

* cited by examiner

CODING SCHEME FOR IMMERSIVE VIDEO WITH ASYMMETRIC DOWN-SAMPLING AND MACHINE LEARNING

CROSS-REFERENCE TO PRIOR APPLICATIONS

This application is the U.S. National Phase application under 35 U.S.C. § 371 of International Application No. PCT/EP2020/076197, filed on Sep. 18, 2020, which claims the benefit of EP Patent Application No. EP 19199240.3, filed on Sep. 24, 2019. These applications are hereby incorporated by reference herein.

FIELD OF THE INVENTION

The present invention relates to video coding. In particular, it relates to methods and apparatuses for encoding and decoding immersive video.

BACKGROUND OF THE INVENTION

Immersive video, also known as six-degree-of-freedom (6DoF) video, is video of a three-dimensional (3D) scene that allows views of the scene to be reconstructed for viewpoints that vary in position and orientation. It represents a development of three-degree-of-freedom (3DoF) video, which allows views to be reconstructed for viewpoints with arbitrary orientation, but only at a fixed point in space. In 3DoF, the degrees of freedom are angular—namely, pitch, roll, and yaw. 3DoF video supports head rotations—in other words, a user consuming the video content can look in any direction in the scene, but cannot move to a different place in the scene. 6DoF video supports head rotations and additionally supports selection of the position in the scene from which the scene is viewed.

To generate 6DoF video requires multiple cameras to record the scene. Each camera generates image data (often referred to as texture data, in this context) and corresponding depth data. For each pixel, the depth data represents the depth at which the corresponding image pixel data is observed, by a given camera. Each of the multiple cameras provides a respective view of the scene. Transmitting all of the texture data and depth data for all of the views may not be practical or efficient, in many applications.

To reduce redundancy between the views, it has been proposed to prune the views and pack them into a "texture atlas", for each frame of the video stream. This approach attempts to reduce or eliminate overlapping parts among the multiple views, and thereby improve efficiency. The non-overlapping portions of the different views, which remain after pruning, may be referred to as "patches". An example of this approach is described in Alvaro Collet et al., "High-quality streamable free-viewpoint video", ACM Trans. Graphics (SIGGRAPH), 34(4), 2015.

SUMMARY OF THE INVENTION

It would be desirable to improve the quality and coding efficiency of immersive video. The approach of using pruning to produce texture atlases, as described above, has the problem that patch edges may give rise to visible artifacts in the reconstructed views rendered after decoding. This is particularly the case when the patch edges do not align with natural edges in the content—for example, if the patches are selected to be rectangular. Rectangular patches can give rise to zig-zag boundaries as a visible artifact in the decoded output. Specular highlights may cause for these coding methods a particular difficulty, because the position of the highlight varies with each view, even though the position of the object is not changing. If a view of the object is reconstructed from multiple patches taken from multiple views, then the variation between views may be particularly prominent in the vicinity of the highlight. This may be visible in the decoded output.

The invention is defined by the claims.

According to examples in accordance with an aspect of the invention, there is provided a method of encoding immersive video, the method comprising:

receiving source video data, comprising a plurality of source views, each source view comprising texture data and depth data;

processing the source video data to generate processed source video data, the processing comprising down-sampling one or more of the source views; and encoding the processed source video data to generate a video bitstream and a metadata bitstream, wherein the video bitstream comprises encoded texture data and encoded depth data, and the metadata bitstream comprises metadata for assisting a decoder to decode the video bitstream, wherein the metadata describes a configuration of the processing that was performed on the one or more source views.

According to embodiments of this method, the need to prune views and generate patches may be avoided. Instead of pruning and converting the source views into patches, each source view may be encoded in its entirety—but with one or more of the source views subsampled to reduce redundancy and thereby reduce the data rate.

The texture data may comprise at least luma (that is, brightness or intensity) information. It may also comprise chroma (that is, colour) information. The depth data may comprise normalised depth data, for example comprising normalised depth values calculated as 1/Z, where Z is depth from a predetermined reference point or reference plane. In each view, the texture data and/or the depth data may comprise a 2D array of pixels.

The processing comprises down-sampling one or more of the source views. Each source view typically comprises a two-dimensional array of pixels. Down-sampling means that size of this array is reduced (in one or both dimensions) by reducing the resolution of the view (in the respective dimensions).

The processing may further comprise filtering in addition to down-sampling. For example, the processing may comprise anti-alias filtering, followed by down-sampling. The metadata may describe a configuration of the down-sampling, a configuration of the filtering, or the configurations of both the filtering and the down-sampling.

Filtering and down-sampling the one or more source views may comprise filtering and down-sampling the texture data or the depth data, or both. The down-sampling may be described by a scaling factor—for example down-sampling by a factor of 2, 4, or 8 in each dimension. Note that the texture data may be down sampled by the same factor as the depth data or by a different factor.

The encoding of the processed source video data may include lossy compression of the texture and/or depth data.

The metadata may further comprise camera parameters associated with the plurality of source views. In general, camera parameters may be specified in a way that makes them independent of the image resolution. For instance, the camera parameters may specify the focal length relative to the sensor width, or may use normalized image coordinates.

Alternatively (for example, when focal length is specified relative to pixel pitch—also known as "pixel units"), then the camera parameters may refer to the full resolution source images or to the down-sampled images. Typically, the image size is known from the video bitstream, but it may also be part of the metadata. The image size may also be part of the camera parameter set.

In the metadata, the down-sampling factor may be specified implicitly by defining two different image resolutions (one in the video bitstream and another in the camera parameters). The decoder may understand by design/specification that it needs to calculate the scaling factor by comparing these resolutions.

In general, the encoder outputs metadata that enables the decoder to determine the amount of down-sampling that has been performed.

The method may further comprise analyzing the source video data to select a configuration for the processing, the processing comprising down-sampling (and optionally filtering) the one or more source views according to the selected configuration.

This can allow the down-sampling (and optionally filtering) to be adapted to the content of the source video data. The analyzing may be based on the camera parameters associated with the plurality of source views, for example. Alternatively or in addition, it may be based on similarity (that is, redundancy) of visual content among the views.

In some embodiments, the analyzing is carried out before the processing of the source video data. In other embodiments, the analyzing involves or depends on the processing (filtering and down-sampling).

The analyzing optionally comprises: analyzing similarity of visual content among the views; assigning a first down-sampling factor to a first view; assigning a second down-sampling factor to a second view; and assigning a third down-sampling factor to a third view, wherein the second down-sampling factor is higher than the third down-sampling factor if the similarity between the first view and the second view is greater than the similarity between the first view and the third view.

The analyzing may comprise: obtaining, based on the source video data, at least one reference view, filtering and down-sampling the one or more of the source views according to a plurality of different configurations, for each of the plurality of different configurations: encoding the respective processed source video data to generate a candidate video bitstream; decoding from the candidate video bitstream one or more of the plurality of source views; reconstructing at least one test view from the decoded one or more source views, the at least one test view corresponding to the at least one reference view; and comparing the reconstructed test view with the reference view, the analyzing further comprising selecting the configuration based on the results of the comparing, the method further comprising selecting, as the video bitstream, the candidate video bitstream associated with the selected configuration.

The at least one reference view may comprise one of the source views. In some embodiments, obtaining at least one reference view may comprise synthesizing a reference view from the source video data. The synthesized reference view may correspond to a viewport different from the source views.

In some embodiments, the analyzing comprises selecting the configuration whose reconstructed test view most closely matched the reference view. In other words, the configuration may be selected based on reducing or minimizing an error between the reference view and the reconstructed test view.

The method may further comprise designing a reconstruction filter using a machine-learning algorithm, wherein the reconstruction filter can be used by a decoder when up-sampling and filtering one or more decoded views, and the metadata further comprises a description of the reconstruction filter.

In some embodiments, the machine-learning algorithm is a convolutional neural network (CNN), optionally using transfer learning.

The description of the reconstruction filter may comprise a set of coefficients (weights) for a CNN. The set of weights may be partial (for example, describing only some layers of the CNN) or complete.

Designing the reconstruction filter may comprise training, using the machine-learning algorithm, filter coefficients of the reconstruction filter to reduce a reconstruction error. The reconstruction error may comprise a difference between a reconstructed test view and a reference view.

The method may comprise: obtaining, based on the source video data, at least one reference view, decoding from the video bitstream one or more of the plurality of source views, and defining a test view corresponding to the reference view, the test view being reconstructed from the decoded one or more source views, wherein designing the reconstruction filter comprises training filter coefficients of the reconstruction filter, using the machine-learning algorithm, so as to reduce an error between the test view and the reference view.

The machine-learning algorithm may be trained to minimize the error between the test view and the reference view.

The test view and the reference view may correspond to one another at least in the sense that they have the same viewport parameters.

In some cases the reference view may simply be one of the source views, and the test view is a reconstruction of that source view. (In this case, synthesizing the reference view may comprise simply copying the source view.) In other cases, the reference view may be a synthesized view that is different from any of the source views.

Also disclosed is a method of decoding immersive video, the method comprising:

receiving a video bitstream and a metadata bitstream, wherein the video bitstream comprises encoded texture data and encoded depth data for each of a plurality of source views, and the metadata bitstream comprises metadata for assisting decoding of the video bitstream;

obtaining viewport parameters of at least one target view to be rendered;

decoding from the video bitstream one or more of the plurality of source views; and reconstructing the at least one target view from the decoded one or more source views, based on the obtained viewport parameters, wherein the metadata describes a configuration of down-sampling that was performed when encoding the one or more source views, and the reconstructing comprises up-sampling and filtering, based on the described configuration, at least one of the decoded one or more source views or a derivative thereof.

The viewport parameters of a view may include a position and orientation that define the view. The parameters may further include a field-of-view.

The derivative of the at least one decoded source view may be a synthesized target view, derived from the source view (for example, by projecting/warping the source view according to the target viewport parameters).

The decoding method may comprise: decoding from the video bitstream at least two of the plurality of source views; and for each of the decoded at least two source views, synthesizing a synthetic target view, based on the viewport parameters, wherein reconstructing the at least one target view comprises up-sampling, filtering, and combining the synthetic target views, according to the configuration described in the metadata.

Synthesizing each synthetic target view may comprise projecting or warping the respective decoded source view, according to the viewport parameters of the target view.

The decoded at least two source views may have been down-sampled by different factors (1×, 2×, 4×, . . . ) at the encoder. They may have different sizes/resolutions.

The up-sampling, filtering, and combining may be carried out in separate steps, or all together. For example, they may be implemented all together by a neural network, such as a CNN.

The synthetic target views may have different scales/resolutions. That is, they may require up-sampling by differing factors.

The up-sampling and filtering may take in various synthetic target views in different scales/resolutions, and up-sample and filter them to reconstruct the at least one target view. The up-sampling, filtering, and combining may comprise using a neural network, operating on the synthetic target views as inputs to produce the at least one target view as an output.

The metadata may comprise a description of a reconstruction filter to be used in the up-sampling and filtering, and the up-sampling and filtering may comprise using the described reconstruction filter.

The description may identify one of a predetermined set of filters. Alternatively or in addition, the description may include filter coefficients.

The filter-description may comprise a partial or complete set of weights for a neural network, and the up-sampling and filtering may comprise processing the decoded one or more source views using a neural network applying the weights.

The video bitstream may be received from a remote encoder, the method further comprising transmitting viewport parameters to the encoder.

The viewport parameters transmitted may be the viewport parameters of the at least one target view, or a prediction of a target view to be rendered in the future. Transmitting upstream an indication or prediction of the target view can facilitate more efficient coding at the encoder, because the encoder can tailor the encoding for the expected target view.

Also provided is a computer program comprising computer code for causing a processing system to implement a method as summarized above when said program is run on the processing system.

The computer program may be stored on a computer-readable storage medium. This may be a non-transitory storage medium.

Further provided is a video encoder configured to encode immersive video, the video encoder comprising:

an input, configured to receive source video data, comprising a plurality of source views, each source view comprising texture data and depth data;

a video processor, configured to process the source video data to generate processed source video data, the processing comprising down-sampling one or more of the source views;

an encoder, configured to encode the processed source video data to generate a video bitstream and a metadata bitstream; and an output, configured to output the video bitstream and the metadata bitstream, wherein the video bitstream comprises encoded texture data and encoded depth data, and the metadata bitstream comprises metadata for assisting a decoder to decode the video bitstream, wherein the metadata describes a configuration of the processing that was performed on the one or more source views.

The video encoder may further comprise a video analyzer, configured to analyze the source video data to select a configuration for the video processor, wherein the video processor is configured to filter and down-sample the one or more source views according to the selected configuration.

The video encoder may further comprise a reference view generator and a reference decoder, wherein: the reference view generator is configured to generate, based on the source video data, at least one reference view, the video processor is configured to filter and down-sample the one or more of the source views according to a plurality of different configurations, for each of the plurality of different configurations: the encoder is configured to encode the respective processed source video data to generate a candidate video bitstream; and the reference decoder is configured to: decode, from the candidate video bitstream, one or more of the plurality of source views, reconstruct at least one test view from the decoded one or more source views, the at least one test view corresponding to the at least one reference view, and compare the reconstructed test view with the reference view, wherein the analyzer is configured to select the configuration based on the results of the comparing, and the output is configured to output, as the video bitstream, the candidate video bitstream associated with the selected configuration.

The reference view generator may be configured to select one of the source views as the at least one reference view and/or may be configured to synthesize a reference view from the source video data.

The video encoder may alternatively or additionally comprise a reference view generator, a reference decoder, and a trainer wherein:

the reference view generator is configured to generate, based on the source video data, at least one reference view;

the reference decoder is configured to decode, from the candidate video bitstream, one or more of the plurality of source views; and the trainer is configured to:

define a test view corresponding to the reference view, the test view being reconstructed from the decoded one or more source views;

design, using a machine-learning algorithm, a reconstruction filter to be used by a decoder when up-sampling and filtering one or more decoded views, wherein the reconstruction filter is designed so as to reduce an error between the test view and the reference view.

Still further provided is a video decoder configured to decode immersive video, the video decoder comprising:

a bitstream input, configured to receive a video bitstream and a metadata bitstream, wherein the video bitstream comprises encoded texture data and encoded depth data for each of a plurality of source views, and the metadata bitstream comprises metadata for assisting decoding of the video bitstream;

a control input, configured to receive viewport parameters of at least one target view to be rendered;

a decoder, configured to decode from the video bitstream one or more of the plurality of source views; and a reconstruction processor, configured to reconstruct the at least one target view from the decoded one or more source views, based on the obtained viewport parameters, wherein the reconstructing comprises up-sampling and filtering, based on the metadata, at least one of the decoded one or more source views or a derivative thereof.

The metadata may comprise a description of a reconstruction filter to be used in the up-sampling and filtering, and the reconstruction processor may be configured to up-sample and filter the at least one of the decoded one or more source views, using the described reconstruction filter.

The reconstruction processor may comprise a synthesizer configured to synthesize a synthetic target view from each of the one or more source views; and an upscaler configured to up-sample, filter, and combine the synthetic target views.

Additionally, there is disclosed a bitstream encoding immersive video, the bitstream comprising:

a video bitstream, comprising encoded texture data and encoded depth data for each of a plurality of source views; and a metadata bitstream, comprising metadata for assisting a decoder to decode the video bitstream, wherein the metadata describes a configuration of down-sampling that was performed on the one or more source views in the process of encoding the video bitstream.

In particular, the metadata may include a description of a reconstruction filter to be used by a decoder when up-sampling and filtering one or more decoded views.

The immersive video bitstream may be encoded and decoded using methods as summarized above. It may be embodied on a computer-readable medium or as a signal modulated onto an electromagnetic carrier wave.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
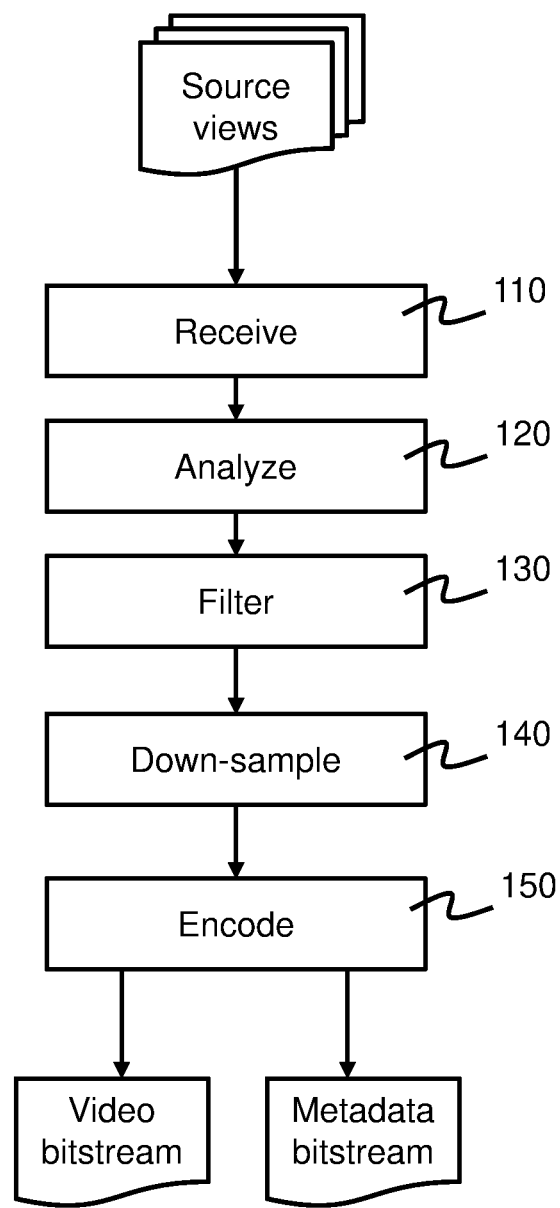
FIG. 1 is a flowchart of a method of encoding 6DoF video according to a first embodiment.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

Methods of encoding and decoding immersive video are disclosed. In an encoding method, source video data comprising a plurality of source views is encoded into a video bitstream. At least one of the source views is filtered and down-sampled prior to encoding. A metadata bitstream associated with the video stream comprises metadata describing a configuration of the filtering and down-sampling, to assist a decoder to decode the video bitstream. It is believed that the use of down-sampled views may help to reduce coding artifacts, compared with a patch-based encoding approach. Also provided are an encoder and a decoder for immersive video, and an immersive video bitstream.

Embodiments of the present invention may be suitable for implementing part of a technical standard, such as MPEG-I Part 12 Immersive Video. Where possible, the terminology used herein is chosen to be consistent with the terms used in MPEG-I Part 12. Nevertheless, it will be understood that the scope of the invention is not limited to MPEG-I Part 12, nor to any other technical standard.

It may be helpful to set out the following definitions/explanations:

A "3D scene" refers to visual content in a global reference coordinate system.

An "atlas" is an aggregation of patches from one or more view representations after a packing process, into a picture pair which contains a texture component picture and a corresponding depth component picture.

An "atlas component" is a texture or depth component of an atlas.

"Camera parameters" define the projection used to generate a view representation from a 3D scene.

"Pruning" is a process of identifying and extracting occluded regions across views, resulting in patches.

A "renderer" is an embodiment of a process to create a viewport or omnidirectional view from a 3D scene representation, corresponding to a viewing position and orientation.

A "source view" is source video material before encoding that corresponds to the format of a view representation, which may have been acquired by capture of a 3D scene by a real camera or by projection by a virtual camera onto a surface using source camera parameters.

A "target view" is defined as either a perspective viewport or omnidirectional view at the desired viewing position and orientation.

A "view representation" comprises 2D sample arrays of a texture component and a corresponding depth component, representing the projection of a 3D scene onto a surface using camera parameters.

A "viewport" means a projection of texture onto a planar surface of a field of view of an omnidirectional or 3D image or video suitable for display and viewing by the user with a particular viewing position and orientation.

A machine-learning algorithm is any self-training algorithm that processes input data in order to produce or predict output data. In some embodiments of the present invention, the input data comprises one or more views decoded from a bitstream and the output data comprises a prediction/reconstruction of a target view.

Suitable machine-learning algorithms for being employed in the present invention will be apparent to the skilled person. Examples of suitable machine-learning algorithms include decision tree algorithms and artificial neural networks. Other machine-learning algorithms such as logistic regression, support vector machines or Naïve Bayesian model are suitable alternatives.

The structure of an artificial neural network (or, simply, neural network) is inspired by the human brain. Neural networks are comprised of layers, each layer comprising a plurality of neurons. Each neuron comprises a mathematical operation. In particular, each neuron may comprise a different weighted combination of a single type of transformation (e.g. the same type of transformation, sigmoid etc. but with different weightings). In the course of processing input data, the mathematical operation of each neuron is performed on the input data to produce a numerical output, and the outputs of each layer in the neural network are fed into one or more other layers (for example, sequentially). The final layer provides the output.

Methods of training a machine-learning algorithm are well known. Typically, such methods comprise obtaining a training dataset, comprising training input data entries and corresponding training output data entries. An initialized machine-learning algorithm is applied to each input data entry to generate predicted output data entries. An error between the predicted output data entries and corresponding training output data entries is used to modify the machine-learning algorithm. This process can be repeated until the error converges, and the predicted output data entries are sufficiently similar (e.g. ±1%) to the training output data entries. This is commonly known as a supervised learning technique.

For example, where the machine-learning algorithm is formed from a neural network, (weightings of) the mathematical operation of each neuron may be modified until the error converges. Known methods of modifying a neural network include gradient descent, backpropagation algorithms and so on.

In embodiments, the training input data entries may correspond to, for example, decoded views from a test video sequence, or a synthetic views reconstructed from those decoded views. The training output data entries may correspond to the original source views (before encoding) or a reference view synthesized directly from the original source views.

A convolutional neural network (CNN, or ConvNet) is a class of deep neural networks, most commonly applied to analyzing visual imagery. CNNs are regularized versions of multilayer perceptrons.

Figure 2:
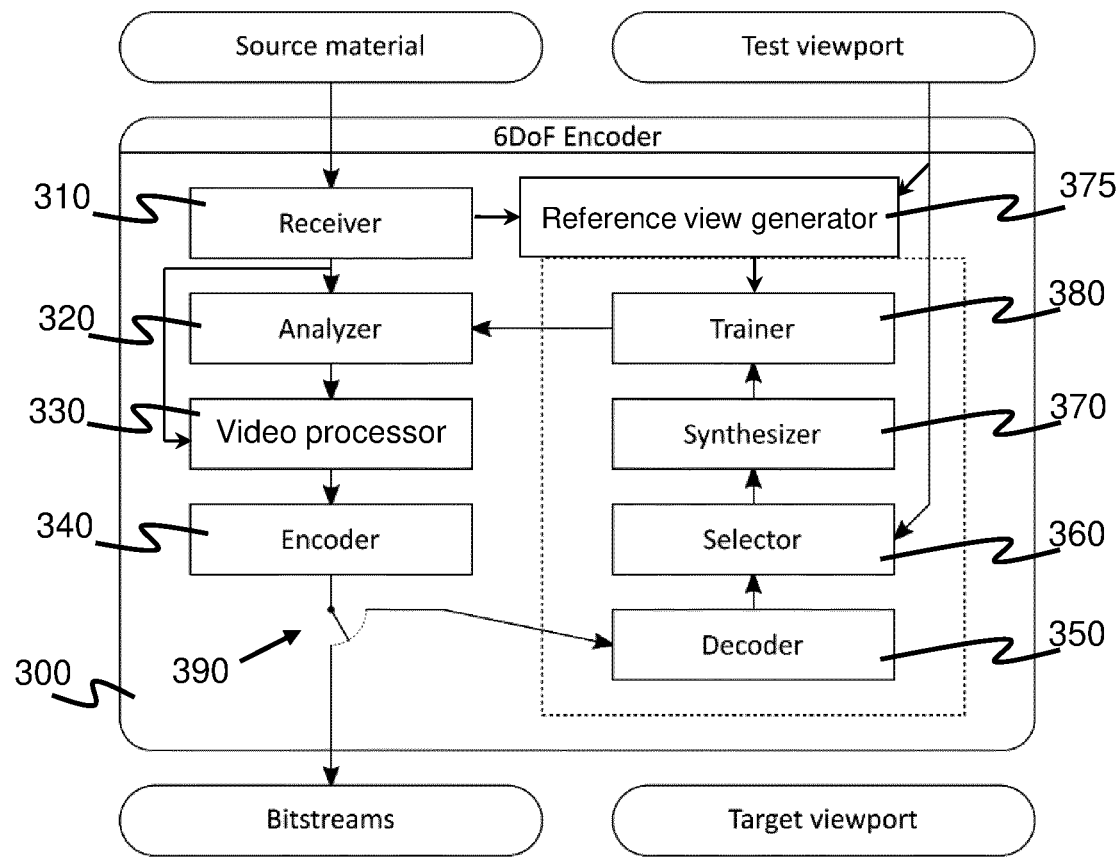
FIG. 2 is a block diagram of a 6DoF encoder according to an embodiment.

FIG. 1 is a flowchart of a method of encoding immersive video according to a first embodiment. FIG. 2 shows a block diagram of a video encoder 300 that may perform the method of FIG. 1.

In step 110, an input (receiver 310) of the encoder 300, receives source video data. The source video data comprises multiple source views, each of which includes texture data and depth data. The receiver 310 is coupled to a video analyzer 320. In step 120, the video analyzer analyzes the source video data to determine the best configuration for subsequent filtering and down-sampling steps. This analysis will be described in greater detail below.

The video analyzer 320 is coupled to a video processor 330. The video processor is also coupled to the receiver 310. The video processor receives the source video data from the receiver 310 and receives information from the video analyzer about the configuration determined by it. In step 130, the video processor filters at least one of the source views and in step 140, the video processor down-samples the filtered source view. The filtering and downsampling are performed according to the configuration determined by the video analyzer.

The output of the video processor is passed to an encoder 340. In step 150, the encoder encodes the processed source video data to generate a video bitstream. The video bitstream comprises encoded texture data and encoded depth data. The encoder 340 also produces a metadata bitstream, comprising metadata for assisting a decoder to decode the video bitstream. In particular, the metadata bitstream includes a description of the filtering and down-sampling that was performed on the one or more source views.

Both the video bitstream and the metadata bitstream are output via an output of the video encoder 300. They may be transmitted to a decoder or may be stored on a machine-readable storage medium, for later reading and decoding. The down-sampling of at least one of the source views achieves compression (bitrate reduction). At the same time, because the method of the first embodiment does not rely on patch-based packing of source views into a texture atlas, artifacts that may be associated with patch edges are avoided.

Figure 3:
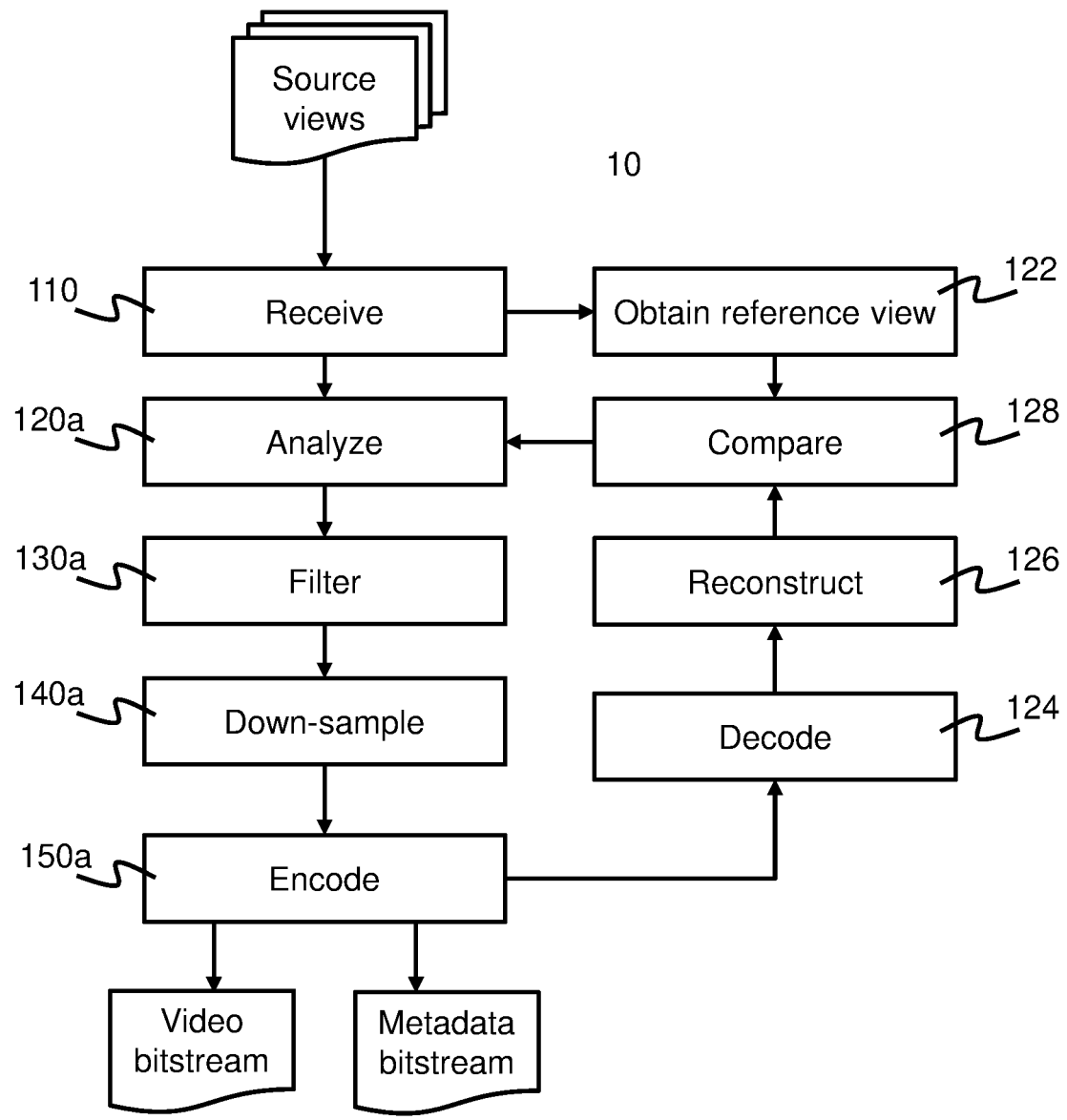
FIG. 3 is a flowchart of a method of encoding 6DoF video according to a second embodiment.

FIG. 3 shows a flowchart of a method of encoding immersive video according to a second embodiment. Steps that are similar to the embodiment of FIG. 1 are given like reference numerals. The method of FIG. 3 differs from the method of FIG. 1 principally in that it in uses a reference decoder in the video encoder.

As shown in FIG. 2, the video encoder 300 includes a reference view generator 375. It also includes a reference decoder, comprising decoder 350, selector 360 and synthesizer 370. The video encoder 300 further comprises a trainer 380, coupled to the reference view generator 375 and the output of the reference decoder—in particular, the output of the synthesizer 370. In step 122, the reference view generator 375 generates at least one reference view, from the source video data. The reference view may be one of the source views or it may be a synthesized view. The reference view chosen is determined by test viewport parameters, input to the video encoder 300.

The steps of analyzing 120a, filtering 130a, and down-sampling 140a are similar to the corresponding steps 120, 130, and 140 of FIG. 1, except that, in the present embodiment, the filtering and down-sampling is performed according to a plurality of different configurations. The aim is to determine the best configuration for filtering and down-sampling the particular content of the source video data. The reference view will be used as a reference or "gold standard", to determine the best configuration.

For each configuration of the filtering and down-sampling, the encoder 340 encodes the respective processed source video data, to generate a candidate bitstream (see step 150a). The candidate bitstreams are passed from the encoder 340 to the reference decoder, via a switch 390. In step 124, the reference decoder decodes from each candidate video bitstream one or more of the plurality of source views. The decoding (step 124) is carried out by decoder 350. The relevant one or more source views are selected by the selector 360, according to the test viewport. From the selected decoded source views, the synthesizer 370 reconstructs a test view according to the test viewport (step 126). Note that if the test viewport corresponds directly to one of the source views, then the synthesizer merely passes that (decoded) source view to the trainer 380. Likewise, the reference view in this case will be the original source view. However, in general, the test viewport is different from any of the source views. In this case, the synthesizer 370 reconstructs (step 126) the test view corresponding to the test viewport from the decoded one or more source views. Likewise, the reference view generator 375 will have synthesized a reference view from the original source views.

In effect, the reference decoder reproduces the decoding operations that will be performed by a real decoder of the video bitstream. Thus, the output of the synthesizer 370 is a reconstructed video stream that is identical to one that might be rendered at the far end decoder. In step 128, the trainer 380 compares the reconstructed test view with the reference view. The result of the comparison is passed to the analyzer 320, and the analyzer selects the filtering and down-sampling configuration that resulted in the lowest error between the reconstructed test view and the reference view. The candidate video bitstream associated with this configuration is then selected as the video bitstream to output, via the switch 390.

In this way, the analysis at the encoder can experiment with different configurations—for example, different filter kernels and/or different down-sampling rates, and can select the configuration that will provide the best performance (in terms of minimum coding error for a given bit rate) at the decoder.

Figure 4:
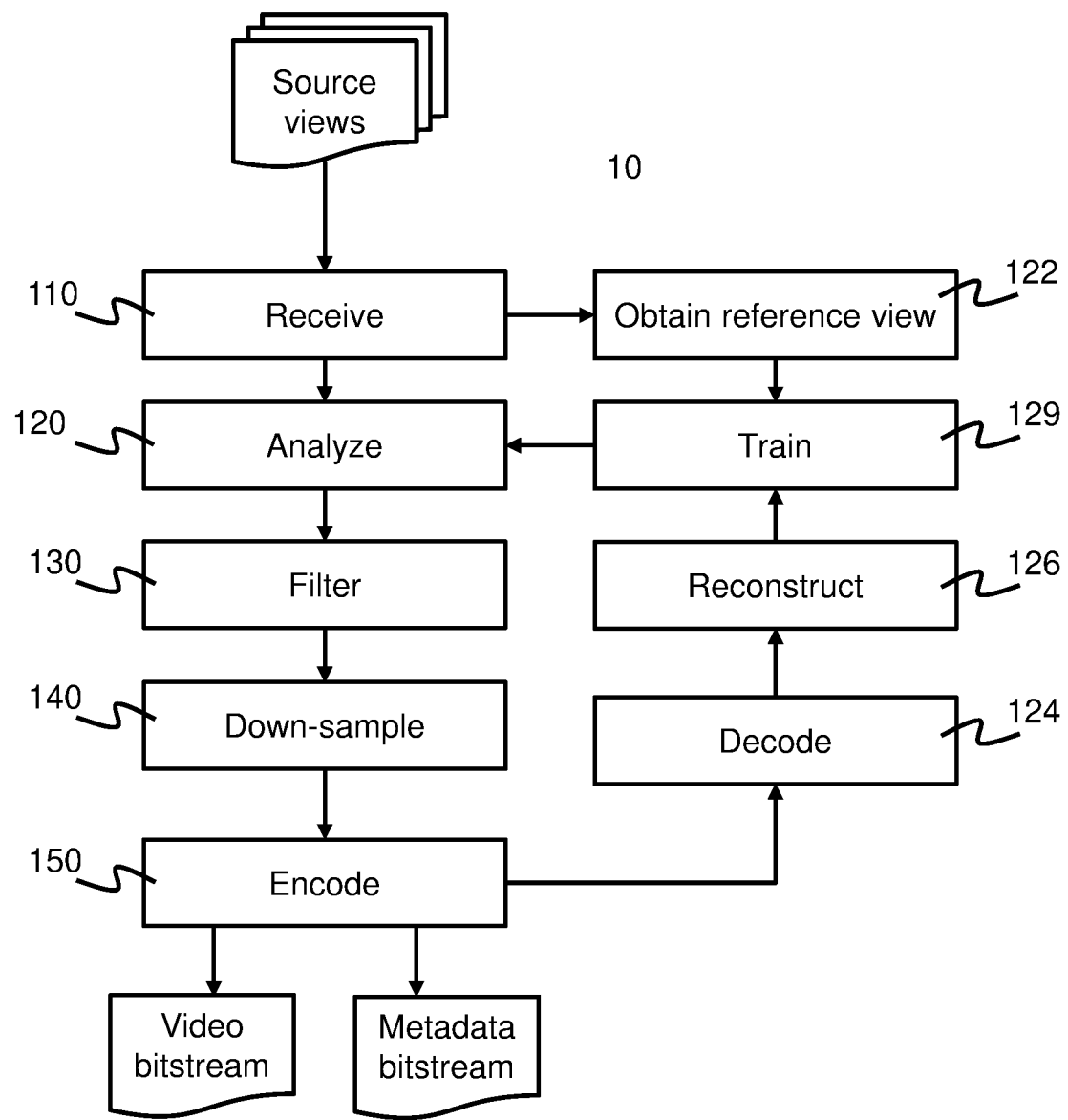
FIG. 4 is a flowchart of a method of encoding 6DoF video according to a third embodiment.

FIG. 4 is another flowchart illustrating an encoding method according to a third embodiment. This is similar to the second embodiment in that it makes use of a reference decoder in the encoding loop. However, it differs from the second embodiment in that the trainer 380 designs, in step 129, a reconstruction filter to be used by the decoder when up-sampling and filtering decoded views. This can be accomplished using machine-learning techniques. Similarly to the second embodiment, a reference view and a corresponding test view are obtained. In step 129, the trainer trains filter coefficients of the reconstruction filter, using a machine-learning algorithm, such that the resulting reconstruction filter minimizes an error between the test view and the reference view. In other words, over the frames of the video data and/or over the pixels of each frame, the machine-learning algorithm learns the set of coefficients that result in the best reconstruction performance. In each iteration of the machine-learning algorithm (for example, for each frame of the video) the synthesizer 370 is applying the current set of filter coefficients, as derived so far by the machine-learning algorithm. As the machine-learning algorithm optimizes the coefficients (for example over successive frames), the reconstructed test view becomes a better approximation of the reference view.

Note that, unlike the second embodiment, the method of the third embodiment does not necessarily require encoding multiple candidate video bitstreams. It is the decoding, and not (necessarily) the encoding, that is being optimized. When the source video data has been encoded into the video bitstream, and the training of the reconstruction filter is complete, the encoder 340 embeds a description of the reconstruction filter into the metadata bitstream. The decoder will use this to form the reconstruction filter which it will use to configure its up-sampling and filtering in the decoding process.

Figure 5:
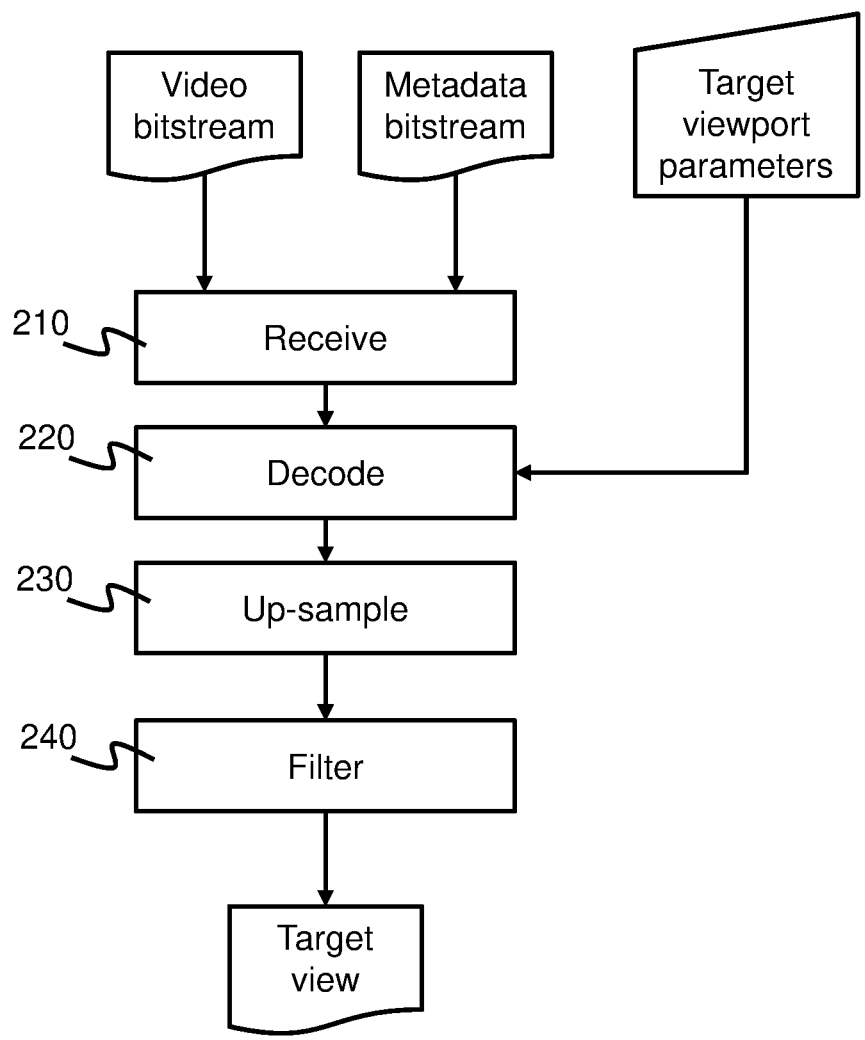
FIG. 5 is a flowchart illustrating a method of decoding 6DoF video according to a fourth embodiment.
Figure 6:
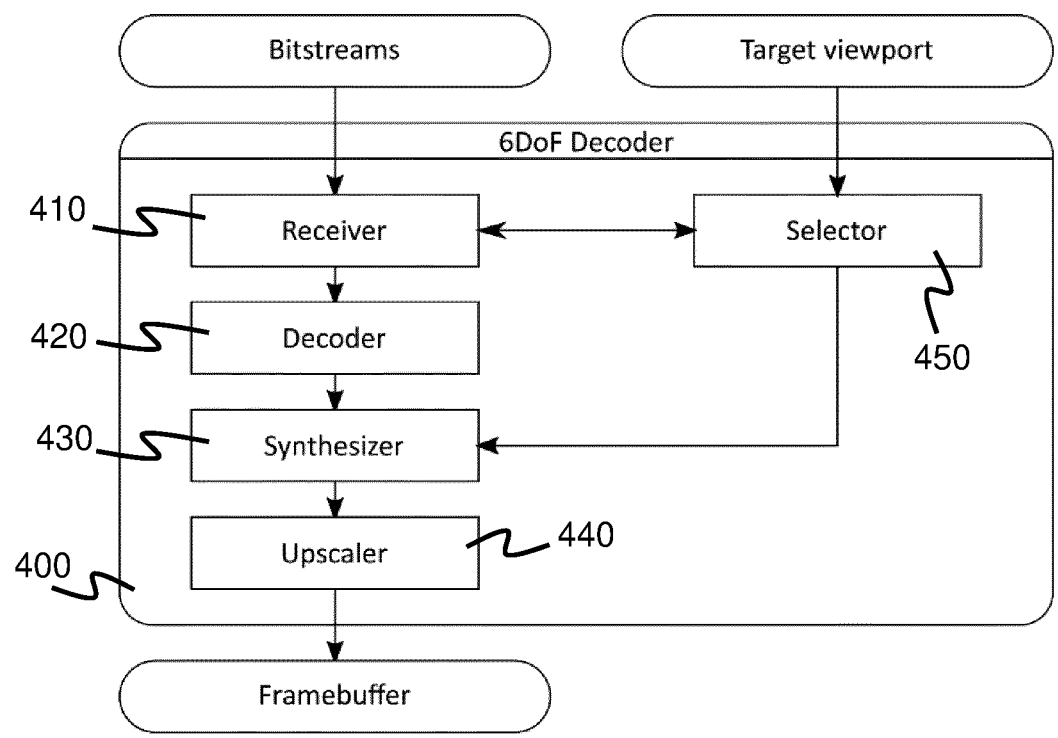
FIG. 6 is a block diagram of a 6DoF decoder according to an embodiment.

FIG. 5 is a flowchart of a method of decoding immersive video according to a fourth embodiment. FIG. 6 shows a block diagram of a corresponding immersive video decoder, which may implement the decoding method, according to an embodiment. The immersive video decoder 400 comprises a bitstream input (receiver 410); a control input (selector 450); a decoder 420; and a reconstruction processor, comprising synthesizer 430 and upscaler 440. The video decoder further comprises a selector 450.

In step 210, the bitstream input receives a video bitstream and a metadata bitstream produced by a video encoder 300 as described above. The selector 450 receives viewport parameters of at least one target view to be rendered. In step 220, the decoder 420 decodes from the video bitstream one or more of the plurality of source views (which may be selected by the selector 450 based on the target viewport parameters). If the decoder 420 has knowledge or a prediction of the target viewport, it can selectively decode the video bitstream accordingly—first decoding the source views that are most relevant to that target viewport and optionally skipping decoding of source views that are not relevant to the target viewport.

The synthesizer 430 and upscaler 440 reconstruct the at least one target view from the decoded one or more source views, based on the target viewport parameters. The reconstruction relies on the metadata bitstream, which describes a configuration of the filtering and down-sampling that was performed at the video encoder 300. The reconstruction comprises up sampling 230 and filtering 240 the one or more decoded source views, dependent upon the configuration described in the metadata bitstream. For example, if a certain source view was down-sampled by a factor of two at the video encoder 300, the up-sampling step 230 may up-sample this view by a factor of two after decoding. The reconstructed target view may be output, for example, to a frame buffer ready for display.

By filtering and down-sampling one or more of the source views at the encoder, and signaling to the decoder—for example—which views were down sampled, and by what down-sampling factor, the bit rate of the video stream can be reduced, while allowing the decoder to achieve high-quality reconstruction results. In some embodiments, the metadata bitstream comprises a description of a reconstruction filter designed by the encoder for use at the decoder. In this case, the step 240 of filtering the decoded source views may comprise filtering using the reconstruction filter that is defined in the metadata bitstream.

Figure 7:
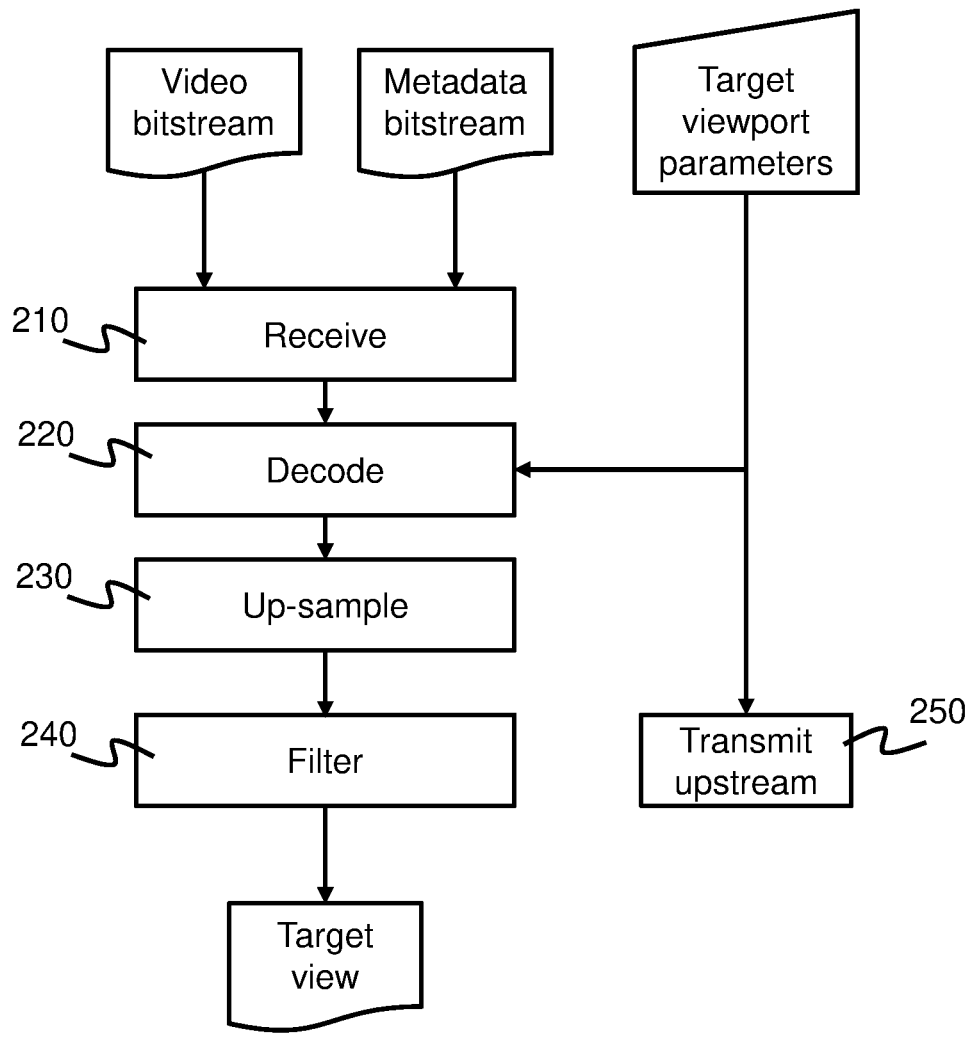
FIG. 7 is a flowchart illustrating a method of decoding 6DoF video according to a fifth embodiment.

FIG. 7 illustrates a variant of the method of FIG. 5, according to a fifth embodiment. In this variant, the target viewport parameters are transmitted upstream to the encoder in step 250. At the encoder, knowledge of the target viewport can be used to optimize the encoding—for example, by allocating higher bit-rates to views that are more relevant for reconstructing the target view. According to another example, the encoder may encode each view at multiple scaling factors, and based on the viewport, the analyzer may decide which bitstreams to transmit to the client. (The decision may change only once per intra period.) It is advantageous that a view similar to the viewport is transmitted at a high resolution.

Figure 8:
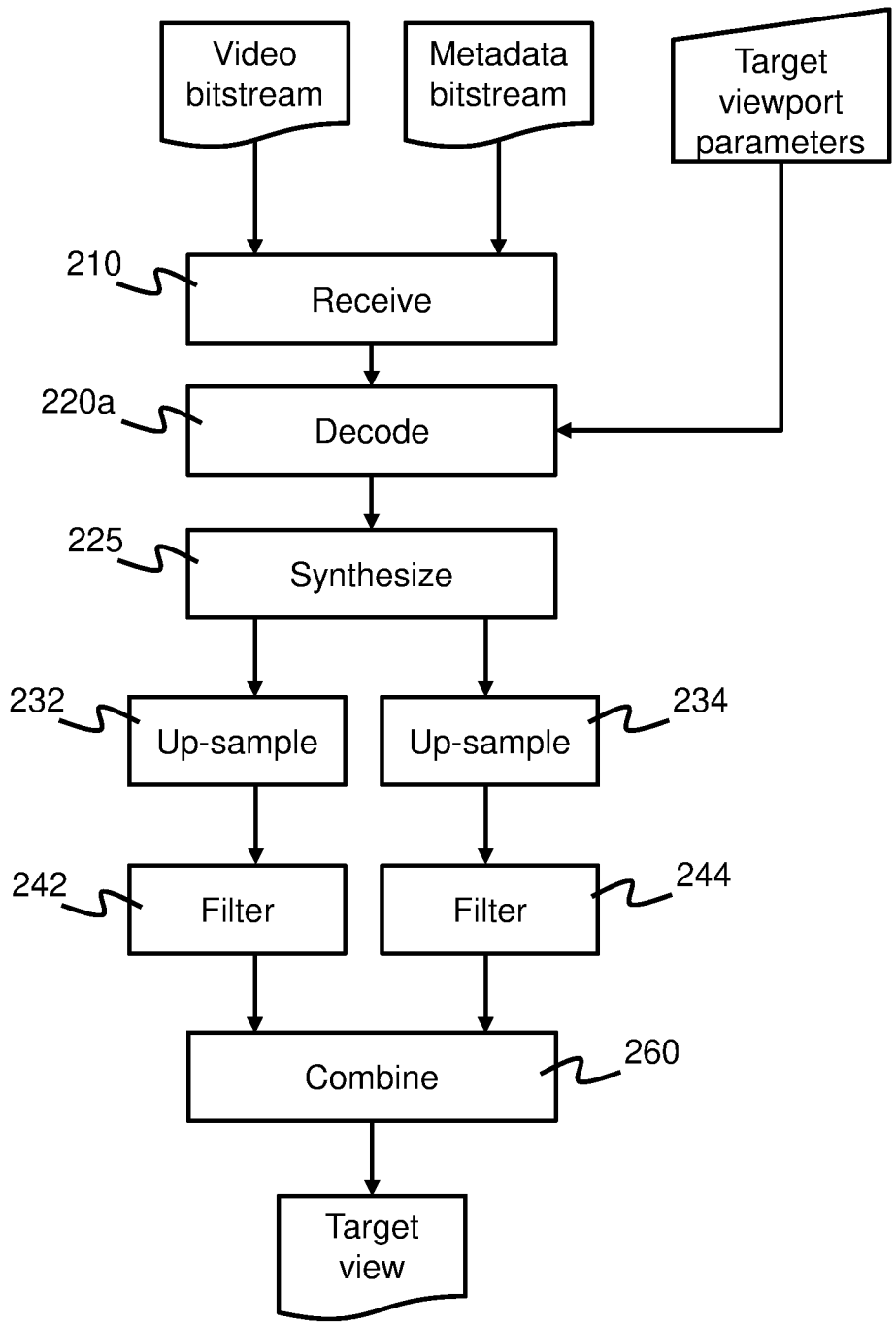
FIG. 8 is a flowchart illustrating a method of decoding 6DoF video according to a sixth embodiment.

FIG. 8 is a flowchart of a decoding method according to a sixth embodiment. In step 220a, the decoder 420 decodes at least two source views from the video bitstream. In step 225, the synthesizer 430 synthesizes a synthetic target view from each of the decoded source views, based on the viewport parameters of the target viewport. This may comprise warping each decoded source view to the target viewport, to generate the respective synthetic target view. In the example illustrated in FIG. 8, the two synthetic target views are up-sampled and filtered separately—one being up-sampled in step 232 and filtered in step 242; and the other being up-sampled in step 234 and filtered in step 244. The up-sampling and filtering may be performed by the upscaler 440. However, this is not essential, and indeed the functions of the upscaler 440 and synthesizer 430 may be shared or combined. In step 260, the two synthetic target views are combined. This may comprise averaging or interpolating between the different synthetic target views. Again, in the present embodiment, it is assumed that combining (step 260) is carried out by the upscale or 440, but this is not essential.

In some embodiments, the up-sampling 230, 232, 234; filtering 240, 242, 244; and combining 260 may be integrated into a single process. This may be the case, in particular, if a reconstruction filter has been designed using a machine-learning algorithm. For example, the reconstruction filter may comprise a set of weights/coefficients for a neural network. This neural network may be configured to reconstruct the target view from the multiple synthetic target views, whereby the steps of up-sampling, filtering, and combining are all performed together by the neural network, which takes the synthetic target views (at different scales/resolutions) as inputs and outputs the reconstructed target view.

Referring again to FIG. 2, the components of the video encoder 300, and their operation in various embodiments, will now be described in additional detail.

The source video data (labelled "source material" in FIG. 2) may be 6DoF source material consisting of views with luma, chroma and depth components. Camera parameters may be provided that allow for reprojecting points from one view to another. For instance, it may be possible to synthesize one view from another and compare similarities and differences due to reflections and occlusions.

Depth may be represented as a dense depth map (optionally in alignment with the texture data), or it may be a 3D mesh that is associated with 2D coordinates into the texture frame. The texture data may comprise luma and chroma, e.g. YUV or RGB.

The 6DoF source material may be the result of an acquisition and estimation process or the result of a post-production process. The source video data may comprise a sequence of frames (a 6DoF video). The source may contain other information such as audio data.

The receiver 310 may receive all material at once (offline processing), a segment of frames at a time or one frame at a time (online). The receiver may buffer information and give frames in segments to the analyzer.

The analyzer 320 may perform computations to identify suitable views for downscaling and any other filtering. The analyzer 320 may be provided with constraints, including but not limited to: constraints in terms of bitrate or pixel rate; or a list of possible filtering operations. Another input to the analyzer may be a decoder profile including a maximum number of views and/or a total number of pixels that the decoder is capable of decoding. The output of the analyzer is 1) a configuration for subsequent operations, and 2) metadata to be transmitted to the decoder.

A list of filtering operations may for instance be {none, downscale 2×, downscale 4×, skip, etc.} but may also include other filtering operations as will be described further below. Some views may be sent at a lower temporal resolution—for example, 15 fps instead of 120 fps.

The analyzer may study only the camera configurations (especially their relative positions in scene space) to identify suitable filter operations. For instance, the most central, forward looking camera could be kept at full resolution (no filter), and then the surrounding cameras are clustered. From each cluster the central camera is downscaled 2×. Then the remaining cameras in each cluster may be downscaled 4×. This pattern could be continued, to have 8×, 16×, (and so on) down-sampling for some cameras. Alternatively, views at the lowest level are skipped. Such 8× or 16× down-sampled thumbnail views do not carry much edge information, but they do provide information on viewpoint-dependent color shifts and moving (semi-)specular highlights. According to some embodiments of the invention, trained filters are able to merge the accurate edges of a high-resolution view with low-resolution near views.

Source views may have different field of views, positions and projections (e.g. fish eye, perspective, etc.) and it is not trivial to compare cameras. Here the notion of viewport similarity may help. A subset of points (at typical depth values) from the first viewport is reprojected to the second viewport and the number of points that match with points in the second viewport is counted. The rays may be weighted by angle or resolution. Various methods of calculating viewport similarity are known in the art.

In some embodiments, the analyzer may perform point re-projection or view synthesis operations from source view to source view, to form a map of the inter-view redundancies. Based on this map, the most useful views are chosen to have the best quality. From the remaining views, the ones with the most information not present in the high quality views may be downscaled 2×, and then all other views could become 4×. It may be that some views are identified to be (almost) completely redundant and the analyzer may decide to skip such views in the subsequent encoding process.

In some embodiments, the analyzer performs multi-pass analysis, in which a 6DoF reference decoder is in the loop with the 6DoF encoder, and the analyzer receives information on the actual quality of test viewports (which may coincide with source views). Based on this, the analyzer can modify the configuration for the next pass. The number of passes may be predetermined or based on the correlation between expected and actual quality as determined by running the 6DoF decoder as part of the 6DoF encoder. This approach may be adopted in the embodiment of FIG. 4, for example.

The video processor 330 receives the source material and is configured by the analyzer 320. All operations may be performed per view or view component. For instance, the texture of a given view may be kept unfiltered, but the depth may be down-sampled by a factor of 4×. At least one view is scaled by some amount.

When the aim is to have a number of pixels corresponding to 2-4 source views, but the number of input views may be 10-100, then down-sampling 2× is not good enough. However, if one view were to be kept at full resolution, and all the others were to be down-sampled by 8×, it is likely that there would not be enough high-resolution information available to render views near the periphery of the viewing space. Instead, it is expected that there may be multiple down-sampling options, e.g. 2×, 4×, 8×, 16×.

The video processor may be configured to deform a view such that the processed view has a relatively higher resolution in some areas (typically those which are determined to be more important—for example, less redundant) and a relatively lower resolution in other areas (typically those which are determined to be less important—for example because of their similarity to other views). The total view would still fit within a given rectangle, and that rectangle would typically be smaller than that of the original (full resolution) source view. Note that this variable resolution operation does not introduce edging artefacts, unlike patch-based pruning/packing.

The video processor may be configured to synthesize a virtual view such as an omnidirectional central view. In general, the decoder may not know if an encoded view is real or virtual. It may be useful to flag this in the metadata. The flag can then be used, for example, by the reconstruction filter at the decoder, which may be configured to prefer physical views more for object edges.

The video processor may be configured to remove certain spatial resolutions. For instance, the low resolution information of a high resolution view may be removed because there are nearby low-resolution views. Another example is to use the down-sampling to maintain more of the high frequency information, at the cost of deliberately causing aliasing. For example, a view may be band-pass or high-pass filtered, to remove low frequencies, and then down-sampled. The high-frequency information is aliased, but is not lost because it is not mixed with low-frequency information.

A view may be filtered in multiple ways, resulting in multiple filtered views for a single source view. For instance, the view may be band pass-filtered in multiple ways (forming a filter bank).

Typically, the encoder 340 uses 2D video compression technology at its core, to compress the multiple views at different resolutions. An encoder may encode the views as separate bitstreams that are transmitted as a multicast stream—for example, HEVC (H.265) or multi-layer HEVC (H.265 Annex F). Alternatively or in addition, the encoder may encode views of the same viewpoints but with different filtering, using a scalable video codec such as such as Scalable HEVC (H.265 Annex H). As a further option, an encoder may apply a multi-view codec. Such an encoder may use inter-view predictions. An example of such a codec is MV-HEVC (H.265 Annex G). As still another option, the encoder itself may use the depth map to make inter-view predictions. An example of such a codec is 3D-HEVC (H.265 Annex I). Such a codec may be improved by using a 6DoF Reference Decoder according to an embodiment of the invention to predict views.

The encoder 340 may pack some views together into a single frame—an atlas—to make better use of decoding capabilities. For instance, having too many decoders may result in synchronization problems. It is typical for such atlases to separate views by a guard band and to align views on whole coding units.

The encoder may use different quantization parameters (QP's) per view, and/or may perform bitrate allocation based on a target bitrate per region in each of the views. For instance, if a region in a view is determined to have less of an impact on the final rendering quality, then this region may be encoded with fewer bits/pixel on average.

The video encoder 300 may include the components of a reference decoder (decoder 350, selector 360 and synthesizer 370). This reference decoder or loop filter may render test viewports. The test viewports are compared with reference views. A reference view may be a source view, or it may be a view that is synthesized directly from the source.

The reason for using decoded views is that the reconstruction filter can be trained to compensate for the reduction in quality that results from lossy compression of the source views. Also, it might occur that with uncompressed views, the analyzer 320 may judge that a particular view is redundant, because it can be accurately predicted; however, when using a decoded version of the view, due to the loss of depth/texture fidelity, it may be determined that it is actually necessary to encode the view (even if not at full resolution).

The reconstructed test view and the reference view are used as training input to train or update filter coefficients of the reconstruction filter. In some embodiments, these coefficients are sent in the metadata bitstream to the 6DoF decoder 400.

Nevertheless, online training/update of the filter coefficients is not essential. In some embodiments, all filters are trained offline (and/or designed/tuned by human experts). In this case, there may be no trainer 380 in the video encoder 300. Instead, the error between the test view and reference view (per view or spatially) is forwarded to the analyzer 320, and the analyzer can use these error-maps to improve the configuration, including the bitrate allocation. Such error-maps could be based on metrics such as PSNR, VIF, VMAF, etc.

One example of the third embodiment (see FIG. 4) makes use of convolutional neural networks with transfer learning. Significant advantages may be gained by using transfer learning. Transfer learning trains part of a neural network offline, but updates the training of another part online—for example, training the last few layers of the neural network online. In this way, less training data is needed to adapt the neural network to the specific content, and only a small proportion of the neural network coefficients need to be transmitted to the video decoder 400—thus reducing metadata bitrate.

Offline, outside of the encoding loop, multiple convolutional neural networks (CNNs) may be pre-trained for a given set of multi-view prediction scenarios. For instance, one CNN is trained that uses two reference views for prediction, where one reference has the original resolution and the other reference has half the original resolution. A second CNN is trained to use three reference views for prediction with a third reference at a quarter of the original resolution. For each multi-view prediction scenario there is a trained CNN. The encoder can compare scenarios, and select the best one. This configuration selection is then added as metadata. Note that texture and depth map do not need to have the same resolution—they may be filtered and down-sampled differently.

The pre-trained CNNs can be refined during encoding, to better model a given video, set of frames, or single frame, using transfer learning. To do this, the weights of the majority of filters (typically the early layers in the network) remain fixed, but weights of the later filters are adjusted. These weights are fitted specifically to model the characteristics of the video that is being encoded. The metadata now contains a reference to the network that was used plus the video specific weights for the modified layers. This can allow a much lower metadata bitrate, without loss of quality.

Referring again to FIG. 6, the components of the video decoder 400, and their operation in various embodiments, will now be described in additional detail.

The 6DoF decoder 400 receives a 6DoF bitstream (or part of such a bitstream). In some embodiments, the receiver 410 receives all encoded information, but in other embodiments a prediction of target viewports is used to determine which subset of elementary bitstreams are needed, and through client-server communication, the server will only stream a subset of the information to the client (video decoder 400). This represents an enhancement of adaptive streaming as used previously for 2D video.

In some embodiments, the decoder 420 simply decodes all (elementary) bitstreams that have been received. However, it may be desirable to apply adaptive decoding.

Because the latency between the decoder 420 and the display is much smaller than between the 6DoF encoder 300 and 6DoF decoder 400, the decoder has access to more accurate target viewport predictions. The decoder 420 may thus determine that only part of the received data has to be decoded. This can help to reduce the complexity and/or power usage of the client device (6DoF decoder 400).

The synthesizer 430 takes a decoded view and a target viewport, and uses view synthesis to predict the target view. In one embodiment, the target viewport may be defined by the orientation of a virtual reality (VR) headset. For a stereo VR headset, there may be one target viewport per eye. In another embodiment the target viewport may be calculated using the inertial measurement unit (IMU) of a handheld device such as a smartphone or tablet computing device. In this case, the viewport will depend on the pose of the device. This approach can be used for "tablet-based augmented reality (AR)", for example.

As mentioned above, it may be that the depth information and texture information are from different views, in which case the depth may be projected first, and the texture fetched next.

In the view synthesis process, it may happen that some information is missing in the target view (disocclusion), or that some information will be at a lower resolution (stretching). The synthesizer 430 may output quality metrics such as a confidence map, or more specific maps such as a resolution map, ray angle map (=map of angles between point, source and target viewport), stretching map, etc. This additional information is then input into the upscaler 440, and optionally the trainer 380 at the 6DoF encoder 300.

The view synthesis process may perform upscaling together with the view synthesis, or it may generate synthesized views at a similar resolution as the input view. In the latter case, the upscaling is left for the upscaler 440.

Typically, the upscaler 440 comprises an image filter. It performs upscaling (if the upscaling was not performed already by the synthesizer 430). It may compensate for missing frequencies. It will typically perform some blending between views.

The Upscaler will often be a trained filter that uses coefficients, which are predetermined and/or were received in the metadata bitstream, to transform the synthesized source views into a single image per viewport.

The analyzer 320 at the 6DoF encoder 300 may determine that the texture of a view is needed, but that the depth information from a nearby view is sufficient. In that case, the depth component of the view may be dropped. In another situation, the analyzer 320 may determine that the depth component of a view is needed to accurately model the foreground-background transitions, but that the texture of a nearby view is sufficient to re-texturize the depth map at the 6DoF decoder 400. In both cases, the upscaler 440 is designed such that it can accept a view with missing components. In an extreme case, there is only one depth map or mesh (sometimes called a geometric proxy) and multiple textures. (At least one of the textures will have a lower resolution than at least one other.)

As mentioned in the description of the receiver 410 and decoder 420, we expect that only part of the available data will be used within the 6DoF decoder 400. Views near to a target viewport carry more information about the target viewport than views further away.

The complexity of training filters may be reduced by allowing only specific numbers of views as input. For instance, a CNN may be trained to take one full view, one 2× downscaled, and one 4× downscaled. There may be multiple networks depending on which of those scalings is nearest, $2^{nd}$ nearest, etc. to the target viewport.

In this case, even when more views would be available temporarily, the selector 450 would still select a fixed number of views. The 6DoF encoder 300 may make use of this property to train more specific filters.

The codec may define which subset of views is active in a given situation. This could be an algorithm that is implemented in the selector 450 (for example, a rule like "always take the three nearest views"), or it could be something that the analyzer 320 determines and transmits as metadata. The metadata could for instance take any of the following forms:

Specify the subset per grid point in the 3D space,
Divide the 3D space into cells where each cell has the subset as attribute,
Algorithm (selection rule) with parameters transmitted as metadata.

Note that, although most of the embodiments described above have used filtering and down-sampling of whole views as an alternative to patch-based pruning, it is possible that these techniques may be combined, in some embodiments. For example, the 6DoF encoder may implement both techniques and may select which of them gives the best coding efficiency when applied to a given video sequence.

The encoding and decoding methods of FIGS. 1, 3, 4, 5, 7 and 8, and the encoder and decoder of FIGS. 2 and 6, may be implemented in hardware or software, or a mixture of both (for example, as firmware running on a hardware device). To the extent that an embodiment is implemented partly or wholly in software, the functional steps illustrated in the process flowcharts may be performed by suitably programmed physical computing devices, such as one or more central processing units (CPUs), graphics processing units (GPUs), or neural network accelerators (NNAs). Each process—and its individual component steps as illustrated in the flowcharts—may be performed by the same or different computing devices. According to embodiments, a computer-readable storage medium stores a computer program comprising computer program code configured to cause one or more physical computing devices to carry out an encoding or decoding method as described above when the program is run on the one or more physical computing devices.

Storage media may include volatile and non-volatile computer memory such as RAM, PROM, EPROM, and EEPROM. Various storage media may be fixed within a computing device or may be transportable, such that the one or more programs stored thereon can be loaded into a processor.

Metadata according to an embodiment may be stored on a storage medium. A bitstream according to an embodiment may be stored on the same storage medium or a different storage medium. The metadata may be embedded in the bitstream but this is not essential. Likewise, metadata and/or bitstreams (with the metadata in the bitstream or separate from it) may be transmitted as a signal modulated onto an electromagnetic carrier wave. The signal may be defined according to a standard for digital communications. The carrier wave may be an optical carrier, a radio-frequency wave, a millimeter wave, or a near field communications wave. It may be wired or wireless.

To the extent that an embodiment is implemented partly or wholly in hardware, the blocks shown in the block diagrams of FIGS. 2 and 6 may be separate physical components, or logical subdivisions of single physical components, or may be all implemented in an integrated manner in one physical component. The functions of one block shown in the drawings may be divided between multiple components in an implementation, or the functions of multiple blocks shown in the drawings may be combined in single components in an implementation. Hardware components suitable for use in embodiments of the present invention include, but are not limited to, conventional microprocessors, application specific integrated circuits (ASICs), and field-programmable gate arrays (FPGAs). One or more blocks may be implemented as a combination of dedicated hardware to perform some functions and one or more programmed microprocessors and associated circuitry to perform other functions.

Generally, examples of methods of encoding and decoding data, a computer program which implements these methods, video encoders and decoders, and a bitstream are indicated by below embodiments.

Embodiments

1. A method of encoding immersive video, the method comprising:
receiving (110) source video data, comprising a plurality of source views, each source view comprising texture data and depth data;
processing the source video data to generate processed source video data, the processing comprising down-sampling (140) one or more of the source views; and
encoding (150) the processed source video data to generate a video bitstream and a metadata bitstream,
wherein the video bitstream comprises encoded texture data and encoded depth data, and the metadata bitstream comprises metadata for assisting a decoder to decode the video bitstream, wherein the metadata describes a configuration of the processing that was performed on the one or more source views.

2. The method of embodiment 1, further comprising analyzing (120) the source video data to select a configuration for the processing, the processing comprising filtering and down-sampling the one or more source views according to the selected configuration.

3. The method of embodiment 2, wherein the analyzing (120) comprises:
analyzing similarity of visual content among the views;
assigning a first down-sampling factor to a first view;
assigning a second down-sampling factor to a second view; and
assigning a third down-sampling factor to a third view,
wherein the second down-sampling factor is higher than the third down-sampling factor if the similarity between the first view and the second view is greater than the similarity between the first view and the third view.

4. The method of embodiment 2 or embodiment 3, wherein the analyzing comprises:
obtaining (122), based on the source video data, at least one reference view,
filtering (130) and down-sampling (140) the one or more of the source views according to a plurality of different configurations,
for each of the plurality of different configurations:
encoding (150) the respective processed source video data to generate a candidate video bitstream;
decoding (124) from the candidate video bitstream one or more of the plurality of source views;
reconstructing (126) at least one test view from the decoded one or more source views, the at least one test view corresponding to the at least one reference view; and
comparing (128) the reconstructed test view with the reference view,
the analyzing (120a) further comprising selecting the configuration based on the results of the comparing,
the method further comprising selecting, as the video bitstream, the candidate video bitstream associated with the selected configuration.

5. The method of any one of the preceding embodiments, further comprising designing (129) a reconstruction filter using a machine-learning algorithm,
wherein the reconstruction filter can be used by a decoder when up-sampling and filtering one or more decoded views, and
the metadata further comprises a description of the reconstruction filter.

6. The method of embodiment 5, comprising:
obtaining (122), based on the source video data, at least one reference view,
decoding (124) from the video bitstream one or more of the plurality of source views, and
defining a test view corresponding to the reference view, the test view being reconstructed (126) from the decoded one or more source views,
wherein designing the reconstruction filter comprises training filter coefficients of the reconstruction filter, using the machine-learning algorithm, so as to reduce an error between the test view and the reference view.

7. A method of decoding immersive video, the method comprising:
receiving (210) a video bitstream and a metadata bitstream, wherein the video bitstream comprises encoded texture data and encoded depth data for each of a plurality of source views, and the metadata bitstream comprises metadata for assisting decoding of the video bitstream;
obtaining viewport parameters of at least one target view to be rendered;
decoding (220) from the video bitstream one or more of the plurality of source views; and
reconstructing the at least one target view from the decoded one or more source views, based on the obtained viewport parameters,
wherein the metadata describes a configuration of down-sampling that was performed when encoding the one or more source views, and
the reconstructing comprises up-sampling (230) and filtering (240), based on the described configuration, at least one of the decoded one or more source views or a derivative thereof.

8. The method of embodiment 7, comprising:
decoding (220a) from the video bitstream at least two of the plurality of source views; and
for each of the decoded at least two source views, synthesizing (225) a synthetic target view, based on the viewport parameters,
wherein reconstructing the at least one target view comprises up-sampling (232, 234), filtering (242,244), and combining (260) the synthetic target views, according to the configuration described in the metadata.

9. The method of embodiment 7 or embodiment 8, wherein the metadata comprises a description of a reconstruction filter to be used in the up-sampling and filtering, and the up-sampling (230, 232, 234) and filtering (240, 242, 244) comprises using the described reconstruction filter.

10. The method of any one of embodiments 7 to 9, wherein the video bitstream is received from a remote encoder, the method further comprising transmitting (250) viewport parameters to the encoder.

11. A computer program comprising computer code for causing a processing system to implement the method of any one of embodiments 1 to 10 when said program is run on the processing system.

12. A video encoder (300) configured to encode immersive video, the encoder comprising:
an input (310), configured to receive source video data, comprising a plurality of source views, each source view comprising texture data and depth data;
a video processor (330), configured to process the source video data to generate processed source video data, the processing comprising down-sampling one or more of the source views;
an encoder (340), configured to encode the processed source video data to generate a video bitstream and a metadata bitstream; and
an output, configured to output the video bitstream and the metadata bitstream,
wherein the video bitstream comprises encoded texture data and encoded depth data, and the metadata bitstream comprises metadata for assisting a decoder to decode the video bitstream, wherein the metadata describes a configuration of the processing that was performed on the one or more source views.

13. The video encoder of embodiment 12, further comprising a video analyzer (320), configured to analyze the source video data to select a configuration for the video processor (330), wherein the video processor is configured to filter and down-sample the one or more source views according to the selected configuration.

14. A video decoder (400) configured to decode immersive video, the video decoder comprising:
a bitstream input (410), configured to receive a video bitstream and a metadata bitstream, wherein the video bitstream comprises encoded texture data and encoded depth data for each of a plurality of source views, and the metadata bitstream comprises metadata for assisting decoding of the video bitstream;
a control input, configured to receive viewport parameters of at least one target view to be rendered;
a decoder (420), configured to decode from the video bitstream one or more of the plurality of source views; and
a reconstruction processor (430, 440), configured to reconstruct the at least one target view from the decoded one or more source views, based on the obtained viewport parameters, wherein the reconstructing comprises up-sampling and filtering, based on the metadata, at least one of the decoded one or more source views or a derivative thereof.

15. A bitstream encoding immersive video, the bitstream comprising:
a video bitstream, comprising encoded texture data and encoded depth data for each of a plurality of source views; and
a metadata bitstream, comprising metadata for assisting a decoder to decode the video bitstream,
wherein the metadata describes a configuration of down-sampling that was performed on the one or more source views in the process of encoding the video bitstream.

More specifically, the invention is defined by the appended CLAIMS.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. If a computer program is discussed above, it may be stored/distributed on a suitable medium, such as an optical storage medium or a solid-state medium supplied together with or as part of other hardware, but may also be distributed in other forms, such as via the Internet or other wired or wireless telecommunication systems. If the term "adapted to" is used in the claims or description, it is noted the term "adapted to" is intended to be equivalent to the term "configured to". Any reference signs in the claims should not be construed as limiting the scope.

The invention claimed is:

1. A method comprising:
receiving source video data,
wherein the source video data comprises a plurality of source views,
wherein each source view comprises texture data and depth data;
analyzing the source video data so as to select a configuration for processing the source video data;
processing the source video data so as to generate processed source video data, wherein the processing comprises down-sampling at least one of the source views according to the configuration; and
encoding the processed source video data so as to generate a video bitstream and a metadata bitstream,
wherein the video bitstream comprises encoded texture data and encoded depth data,
wherein the metadata bitstream comprises metadata,
wherein the metadata is arranged to assist a decoder to decode the video bitstream,
wherein the metadata describes the configuration of the processing that was performed on the one or more source views,
wherein the analyzing comprises analyzing similarity of visual content among the source views,
wherein the analyzing comprises assigning a first down-sampling factor to a first view,
wherein the analyzing comprises assigning a second down-sampling factor to a second view,
wherein the analyzing comprises assigning a third down-sampling factor to a third view,
wherein the second down-sampling factor is higher than the third down-sampling factor if the similarity between the first view and the second view is greater than the similarity between the first view and the third view.

2. The method of claim 1, further comprising selecting a candidate video bitstream associated with the configuration as the video bitstream,
wherein the analyzing comprises obtaining at least one reference view based on the source video data,
wherein the analyzing comprises filtering and down-sampling at least one of the source views according to a plurality of different configurations,
wherein the analyzing comprises encoding the respective processed source video data so as to generate the candidate video bitstream for each of the plurality of different configurations,
wherein the analyzing comprises decoding from the candidate video bitstream at least one of the plurality of source views for each of the plurality of different configurations, wherein the analyzing comprises reconstructing at least one test view from the at least one decoded source views for each of the plurality of different configurations, wherein the at least one test view corresponds to the at least one reference view, wherein the analyzing comprises comparing the reconstructed test view with the reference view for each of the plurality of different configurations, wherein the analyzing comprises selecting the configuration based on the results of the comparing.

3. The method of claim 1, further comprising designing a reconstruction filter using a machine-learning algorithm, wherein the reconstruction filter is used by a decoder when up-sampling and filtering at least one decoded views, the metadata comprises a description of the reconstruction filter.

4. The method of claim 3, further comprising:

obtaining, at least one reference view based on the source video data;

decoding at least one of the plurality of source views from the video bitstream; and defining a test view, wherein the test view corresponds to the reference view, wherein the test view is reconstructed from the at least on decoded source views, wherein designing the reconstruction filter comprises training filter coefficients of the reconstruction filter, wherein designing the reconstruction filter comprises using the machine-learning algorithm, so as to reduce an error between the test view and the reference view.

5. A computer program stored on a non-transitory medium, wherein the computer program when executed on a processor performs the method as claimed in claim 1.

6. A method of comprising:

receiving a video bitstream and a metadata bitstream, wherein the video bitstream comprises encoded texture data and encoded depth data for each of a plurality of source views, wherein the metadata bitstream comprises metadata for assisting decoding of the video bitstream;

obtaining viewport parameters of a rendering of at least one target view;

decoding at least two of the plurality of source views from the video bitstream; and reconstructing the at least one target view from the at least two decoded source views, based on the obtained viewport parameters, wherein the metadata describes a configuration of down sampling; and synthesizing a synthetic target view, based on the viewport parameters for each of the at least two decoded source views, wherein reconstructing the at least one target view comprises up-sampling, filtering, and combining the synthetic target views, according to the configuration.

7. The method of claim 6, wherein the metadata comprises a description of a reconstruction filter, wherein the up-sampling and filtering, and the up-sampling and filtering comprises using the reconstruction filter.

8. The method claim 6, the method further comprising transmitting viewport parameters to an encoder.

9. A computer program stored on a non-transitory medium, wherein the computer program when executed on a processor performs the method as claimed in claim 6.

10. A video encoder comprising:

an input circuit, wherein the input circuit is arranged to receive source video data, wherein the source video data comprises a plurality of source views, wherein each source view comprises texture data and depth data;

a video analyzer circuit;

a video processor circuit;

an encoder circuit; and an output circuit, wherein the video analyzer circuit is arranged to analyze the source video data so as to select a configuration;

wherein the video processor circuit is arranged to process the source video data so as to generate processed source video data, wherein the processing comprises down-sampling at least of the source views, wherein the video processor circuit is arranged to down-sample the at least one source views according to the configuration;

wherein the encoder circuit is arranged to encode the processed source video data so as to generate a video bitstream and a metadata bitstream, wherein the output circuit is arranged to output the video bitstream and the metadata bitstream, wherein the video bitstream comprises encoded texture data and encoded depth data, wherein the metadata bitstream comprises metadata, wherein the metadata is arranged to assist a decoder circuit to decode the video bitstream, wherein the metadata describes the configuration of the processing at least, wherein the video analyzer circuit is arranged to analyze similarity of visual content among the source views, wherein the video analyzer circuit is arranged to assign a first down-sampling factor to a first view, wherein the video analyzer circuit is arranged to assign a second down-sampling factor to a second view, wherein the video analyzer circuit is arranged to assign a third down-sampling factor to a third view, wherein the second down-sampling factor is higher than the third down-sampling factor if the similarity between the first view and the second view is greater than the similarity between the first view and the third view.

11. The video encoder of claim 10, further comprising a selecting circuit, wherein the selecting circuit is a arranged to select a candidate video bitstream associated with the configuration as the video bitstream, wherein the video analyzer circuit is arranged to obtain at least one reference view based on the source video data, wherein the video analyzer circuit is arranged to filter and down-sampling at least one of the source views according to a plurality of different configurations, wherein the video analyzer circuit is arranged to encode the respective processed source video data so as to generate the candidate video bitstream for each of the plurality of different configurations, wherein the video analyzer circuit is arranged to decode from the candidate video bitstream at least one of the plurality of source views for each of the plurality of different configurations, wherein the video analyzer circuit is arranged to reconstruct at least one test view from the at least one decoded source views for each of the plurality of different configurations, wherein the at least one test view corresponds to the at least one reference view, wherein the video analyzer circuit is arranged to compare the reconstructed test view with the reference view for each of the plurality of different configurations, wherein the video analyzer circuit is arranged to select the configuration based on the results of the comparing.

12. The video encoder of claim 10, further comprising a designing circuit, wherein the designing circuit is arranged to design a reconstruction filter using a machine-learning algorithm, wherein the reconstruction filter is used by a decoder circuit when up-sampling and filtering at least one decoded views, the metadata comprises a description of the reconstruction filter.

13. The video encoder of claim 10, further comprising a designing circuit and a defining circuit, wherein the input circuit is arranged to obtain at least one reference view based on the source video data, wherein the decoder circuit is arranged to decode at least one of the plurality of source views from the video bitstream, wherein the defining circuit is arranged to define a test view, wherein the test view corresponds to the reference view, wherein the test view is reconstructed from the at least on decoded source views, wherein designing the reconstruction filter comprises training filter coefficients of the reconstruction filter, wherein designing the reconstruction filter comprises using the machine-learning algorithm, so as to reduce an error between the test view and the reference view.

14. A video decoder comprising:

a bitstream input circuit, wherein the bitstream input circuit is arranged to receive a video bitstream and a metadata bitstream, wherein the video bitstream comprises encoded texture data and encoded depth data for each of a plurality of source views, wherein the metadata bitstream comprises metadata for assisting decoding of the video bitstream;

a control input circuit, wherein the control input circuit is arranged to receive viewport parameters of at least one target view;

a decoder circuit, wherein the decoder circuit is arranged to decode from the video bitstream at least two of the plurality of source views; and a reconstruction processor circuit, wherein the reconstruction processor circuit is arranged to reconstruct the at least one target view from the at least two decoded source views, based on the obtained viewport parameters, wherein the reconstruction processor circuit comprises a synthesizer circuit and an upscaler circuit, wherein the synthesize circuit is arranged to synthesize a synthetic target view from each of the at least two decoded source views, wherein the upscaler is arranged to up-sample, filter, and combine the synthetic target views.

15. The video decoder of claim 14, wherein the metadata comprises a description of a reconstruction filter, wherein the up-sampling and filtering, and the up-sampling and filtering comprises using the reconstruction filter.

16. The video decoder of claim 14, wherein the output circuit is arranged to transmit viewport parameters to an encoder circuit.

* * * * *

UNITED STATES PATENT AND TRADEMARK OFFICE
CERTIFICATE OF CORRECTION

Page 1 of 3

PATENT NO. : 11,792,453 B2
APPLICATION NO. : 17/642965
DATED : October 17, 2023
INVENTOR(S) : Bart Kroon and Christiaan Varekamp It is certified that error appears in the above-identified patent and that said Letters Patent is hereby corrected as shown below:

In the Claims

Column 23 Line 12 cancel the text beginning with "3. The method of claim 1," and ending with "reconstruction filter." on Column 23 Line 19 and insert the following claim:
--3. The method of claim 1, further comprising designing a reconstruction filter using a machine-learning algorithm,
wherein the reconstruction filter is used by a decoder when up-sampling and filtering at least one decoded views,
wherein the metadata comprises a description of the reconstruction filter.--

Column 23 Line 20 cancel the text beginning with "4. The method of claim 3, further comprising:" and ending with "reference view." on Column 23 Line 13 and insert the following claim:
--4. The method of claim 3, further comprising:
obtaining, at least one reference view based on the source video data;
decoding at least one of the plurality of source views from the video bitstream; and
defining a test view,
wherein the test view corresponds to the reference view,
wherein the test view is reconstructed from the at least one decoded source views,
wherein designing the reconstruction filter comprises training filter coefficients of the reconstruction filter,
wherein designing the reconstruction filter comprises using the machine-learning algorithm, so as to reduce an error between the test view and the reference view.--

Column 23 Line 59 cancel the text beginning with "7. The method of claim 6," and ending with "reconstruction filter." on Column 23 Line 65 and insert the following claim:
--7. The method of claim 6,
wherein the metadata comprises a description of a reconstruction filter,
wherein the up-sampling and filtering comprises using the reconstruction filter--

Signed and Sealed this
Third Day of February, 2026

John A. Squires
*Director of the United States Patent and Trademark Office*

CERTIFICATE OF CORRECTION (continued)
U.S. Pat. No. 11,792,453 B2

Column 24 Line 4 cancel the text beginning with "10. A video encoder comprising:" and ending with "and the third view." on Column 24 Line 52 and insert the following claim:

--10. A video encoder comprising:

an input circuit, wherein the input circuit is arranged to receive source video data, wherein the source video data comprises a plurality of source views, wherein each source view comprises texture data and depth data;

a video analyzer circuit;

a video processor circuit;

an encoder circuit; and an output circuit, wherein the video analyzer circuit is arranged to analyze the source video data so as to select a configuration, wherein the video processor circuit is arranged to process the source video data so as to generate processed source video data, wherein the processing comprises down-sampling at least one of the source views, wherein the video processor circuit is arranged to down-sample the at least one source views according to the configuration, wherein the encoder circuit is arranged to encode the processed source video data so as to generate a video bitstream and a metadata bitstream, wherein the output circuit is arranged to output the video bitstream and the metadata bitstream, wherein the video bitstream comprises encoded texture data and encoded depth data, wherein the metadata bitstream comprises metadata, wherein the metadata is arranged to assist a decoder circuit to decode the video bitstream, wherein the metadata describes the configuration of the processing at least, wherein the video analyzer circuit is arranged to analyze similarity of visual content among the source views, wherein the video analyzer circuit is arranged to assign a first down-sampling factor to a first view, wherein the video analyzer circuit is arranged to assign a second down-sampling factor to a second view, wherein the video analyzer circuit is arranged to assign a third down-sampling factor to a third view, wherein the second down-sampling factor is higher than the third down-sampling factor if the similarity between the first view and the second view is greater than the similarity between the first view and the third view.--

Column 25 Line 27 cancel the text beginning with "13. The video encoder of claim 10," and ending with "the reference view." on Column 26 Line 3 and insert the following claim:

--13. The video encoder of claim 10, further comprising a designing circuit and a defining circuit, wherein the input circuit is arranged to obtain at least one reference view based on the source video data, wherein the decoder circuit is arranged to decode at least one of the plurality of source views from the video bitstream, wherein the defining circuit is arranged to define a test view, wherein the test view corresponds to the reference view, wherein the test view is reconstructed from the at least one decoded source views, wherein designing the reconstruction filter comprises training filter coefficients of the reconstruction filter, wherein designing the reconstruction filter comprises using the machine-learning algorithm, so as to reduce an error between the test view and the reference view.--

Column 26 Line 4 cancel the text beginning with "14. A video decoder comprising:" and ending with "synthetic target views." on Column 26 Line 29 and insert the following claim:

--14. A video decoder comprising:
a bitstream input circuit, wherein the bitstream input circuit is arranged to receive a video bitstream and a metadata bitstream, wherein the video bitstream comprises encoded texture data and encoded depth data for each of a plurality of source views, wherein the metadata bitstream comprises metadata for assisting decoding of the video bitstream;
a control input circuit, wherein the control input circuit is arranged to receive viewport parameters of at least one target view;
a decoder circuit, wherein the decoder circuit is arranged to decode from the video bitstream at least two of the plurality of source views; and
a reconstruction processor circuit, wherein the reconstruction processor circuit is arranged to reconstruct the at least one target view from the at least two decoded source views, based on the obtained viewport parameters, wherein the reconstruction processor circuit comprises a synthesizer circuit and an upscaler circuit, wherein the synthesizer circuit is arranged to synthesize a synthetic target view from each of the at least two decoded source views, wherein the upscaler is arranged to up-sample, filter, and combine the synthetic target views.--